United States Patent [19]
Sandstrom et al.

[11] Patent Number: 5,964,969
[45] Date of Patent: Oct. 12, 1999

[54] TIRE WITH WHITE SIDEWALL

[75] Inventors: Paul Harry Sandstrom, Tallmadge; George Philemon Patitsas, Kent; Thomas Joseph Segatta, Copley, all of Ohio

[73] Assignee: The Goodyear Tire & Rubber Company, Akron, Ohio

[21] Appl. No.: 08/878,887

[22] Filed: Jun. 19, 1997

[51] Int. Cl.⁶ .............................. B60C 13/00; C08K 3/22; C08L 23/16

[52] U.S. Cl. .......................... 152/524; 152/525; 524/497; 525/211; 525/232; 525/240

[58] Field of Search ............................ 524/497; 525/232, 525/211, 240; 152/524, 525

[56] References Cited

U.S. PATENT DOCUMENTS

| | | | |
|---|---|---|---|
| 3,830,274 | 8/1974 | Waser, Jr. | 152/524 |
| 5,710,218 | 1/1998 | Nakahama | 525/211 |

*Primary Examiner*—James J. Seidleck
*Assistant Examiner*—Olga Asinovsky
*Attorney, Agent, or Firm*—Henry C. Young Jr

[57] ABSTRACT

This invention relates to a pneumatic rubber tire having a rubber sidewall with at least a portion of its outer surface being composed of white rubber devoid of carbon black reinforcement and composed of an elastomer composition prepared as a combination of EPDM, chlorobutyl rubber, diene-based elastomers and liquid EPDM. The liquid EPDM component replaces at least a portion of a traditionally used naphthenic/paraffinic processing oil.

20 Claims, 1 Drawing Sheet

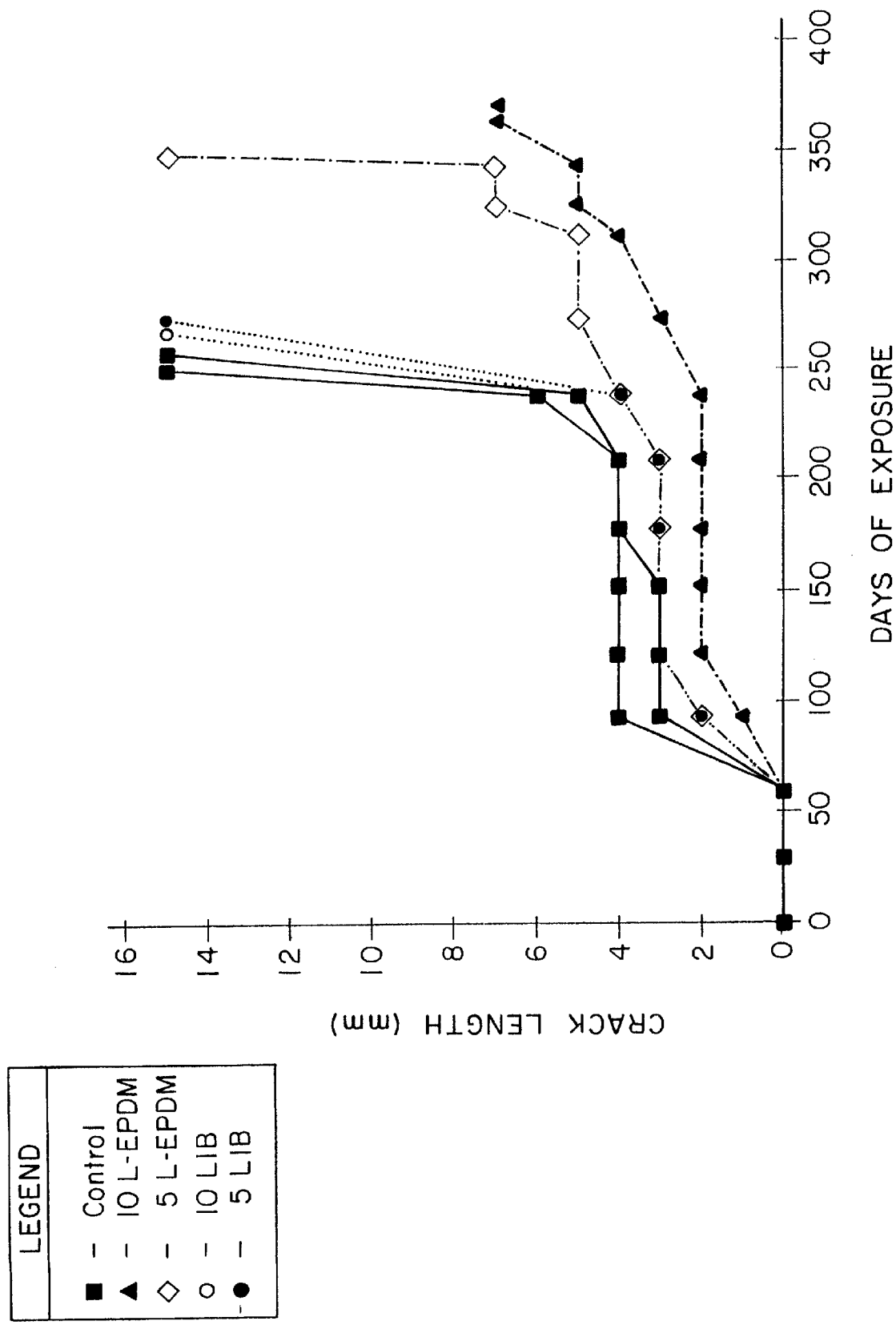

TIRE WITH WHITE SIDEWALL

TECHNICAL FIELD OF INVENTION

This invention relates to a pneumatic rubber tire having a rubber sidewall with at least a portion of its outer surface being composed of white rubber devoid of carbon black reinforcement and composed of an elastomer composition prepared as a combination of EPDM, chlorobutyl rubber, diene-based elastomers and liquid EPDM. The liquid EPDM component may replace at least a portion of a traditionally used naphthenic/paraffinic processing oil.

BACKGROUND

Pneumatic rubber tires conventionally have rubber sidewalls composed of carbon black reinforced rubber compositions which are, therefore, black in color. Sometimes it is desirable to provide a decorative white colored rubber composition on a portion of an outer surface of such tire sidewall. Such rubber composition is conventionally colored white with titanium dioxide pigment and is devoid of, or does not contain, carbon black.

Sidewalls of rubber tires may age somewhat prematurely due to various factors which include (1) weathering due to atmospheric conditions such as, for example, exposure to ultraviolet light, ozone and high humidity; (2) fatigue cracking due to continual flexing of the tire sidewall under operating conditions; and (3) abrasion due to scuffing against road curbs and other objects. White colored tire sidewalls are of special concern because, due to the white color of the sidewalls, the weathering, fatigue cracking and abrasion may be more cosmetically observable than for black colored sidewalls.

In particular, it is well known that ozone causes surface cracking of conventional highly unsaturated rubber vulcanizates used in tires when the rubber is placed under strain in an ozone environment. The most severe deterioration occurs when a number of cracks are formed which grow rapidly into deep, disruptive fissures. These ozone cracks seriously shorten the serviceable life of the tire, especially in the area of the sidewall.

Conventional chemical antiozonants have been developed which retard the formation of ozone cracks occurring under static and dynamic conditions. Examples of antiozonants in common use include: N-phenyl-N'-(1,3-dimethylbutyl)-p-phenylenediamine; N-phenyl-N'-isopropyl-p-phenylenediamine; N-phenyl-N'(-1,4-dimethylpentyl-p-phenylene diamine; N-phenyl-N'-(1-methylheptyl)-p-phenylenediamine; N-phenyl-N'-cyclohexyl-p-phenylenediamine; mixed diaryl-p-phenylene diamines; N,N'-diphenyl-p-phenylenediamine; N,N'-dibeta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine and blends of these materials.

While the use of these well-known paraphenylenediamine materials has improved the ozone protection under both static and dynamic conditions, the use of these materials adds to the cost of the rubber and even the best of the above class of compounds just described has a very strong tendency to both stain and discolor the rubber compound containing these materials.

In practice, for white sidewalls, weathering is typically retarded by the use of non-staining antidegradants and the use of low unsaturation rubbers such as, for example, halobutyl rubber—particularly chlorobutyl rubber, and EPDM rubber. EPDM rubbers are well known to those skilled in such art and, generally mean ethylene/propylene terpolymer elastomers, with a minor amount of non-conjugated diene (e.g., 1 to 15 percent of the terpolymer), e.g., hexadiene, dicyclopentadiene or ethylidene norbornene. The unsaturated part of the polymer molecule is pendant from the main chain, which is essentially completely saturated.

SUMMARY OF THE INVENTION

In accordance with this invention, a sulfur vulcanized white rubber sidewall composition is provided wherein at least a portion of the composition is at least one low molecular weight, typically liquid or wax-like, EPDM rubber.

It is an object of this invention to provide an antiozonant material which is highly effective in protecting the white sidewall from ozone attack. It is also an object to provide ozone protection to a natural rubber/EPDM/butyl rubber blend which retains the flex fatigue of the tire into which this blend is incorporated.

As will be hereinafter described, such crack resistance is accomplished by the use of a combination of rubbers and an inclusion of a small amount of a low molecular weight, typically liquid or wax-like, EPDM rubber in the preparation of the white sidewall tire compositions.

BRIEF DESCRIPTION OF DRAWING

The invention may take physical form in certain parts and arrangements of parts, a preferred embodiment of which will be described in detail in the specification and illustrated in the accompanying drawing which forms a part hereof, and wherein the drawing is a plot of crack length (mm) over time for a control sample (#1) depicted graphically by a solid square (■), samples with 5 (#2) and 10 (#3) phr liquid polyisobutylene (Parapol™ 2500) depicted graphically by a solid circle (●) and open circle (○) respectively, and samples with 5 (#4) and 10 (#5) phr liquid EPDM rubber (Trilene® 67) depicted graphically by an open diamond (◇) and a solid triangle (▲) respectively.

DETAILED DESCRIPTION OF THE INVENTION

The invention generally relates to vulcanized sidewall rubber compositions which have a non-black, hydrocarbon rubber portion thereon or integral therewith. The present invention will be described with respect to a preferred embodiment of white tire sidewalls, the white sidewall region being a component in a toroidal-shaped pneumatic tire. It is to be understood that it can also be applied to numerous articles or products such as bumper strips, vehicle protection or trim strips, tennis shoes and the like. The white regions on a tire sidewall are generally prepared by assembling a white colored compounded rubber with the tire forming components during the assembly of a green (uncured) tire. The white colored rubber is desirably cured in the mold with the other portions of the tire. The white colored component is formulated so that it is compatible with the other components and bonds well with the cured elastomers of the tire.

In this preferred embodiment, the rubber tire will have a rubber sidewall composed of a carbon black reinforced rubber composition with at least a portion of its outer surface being a white rubber composition, i.e., devoid of carbon black reinforcement. The white sidewall composition will be a multi-component system which will include at least one diene-based rubber; at least one butyl rubber; at least one EPDM rubber having a molecular weight of greater than about 75,000 to about 1 million; at least one lower molecular weight, typically liquid or wax-like, EPDM rubber having a molecular weight of about 10,000 to about 50,000 inclusive; and a titanium dioxide pigment.

By the term "non-black" it is meant any color or reflectivity which is greater than zero, on the CIE 1976 L* scale such as rubbers which have a CIE 1976 L* value, of at least 40, desirably at least 50, preferably at least 60, and more preferably at least 70, 80, or 85. A pure white color on the CIE 1976 L* scale has a value of 100, while a black color has a value of 0. Reference to the CIE 1976 L* scale can be readily found in ASTM E 308-94a.

Pneumatic tires generally comprise a tread region which is designed to contact the road or path, two or more sidewalls which help contain the air and provide lateral support, and bead areas which make contact with a rim.

A preferred method of forming the white regions of the sidewall is to extrude the white colored component to another (generally black) tire component. The extruded white colored compound has a thin skin of a compounded rubber that matches the composition and color of the tire and which covers the white rubber component. When this covered white component is co-cured with the tire and thus adhered or chemically joined thereto, the entire tire sidewall appears to be one color irrespective of whether raised or depressed regions are present on the tire such as letters, or rings, logos, etc. The tire manufacturer can then expose the white component by grinding or abrading away the thin skin to remove the same and expose any desired regions of white rubber. Typically letters spelling a trade name, tire sizes, shape designation, etc. are raised letters (protrude above the rest of the sidewall) while rings around the tire can be raised or recessed.

White Sidewall Composition

In practice, the white sidewall composition is characterized by being comprised, based on 100 parts by weight rubber (phr) of: (a) about 20–45 phr of at least one diene-based rubber; (b) about 45–75 phr of a butyl rubber, including halobutyl rubbers and/or blends thereof and/or copolymers therewith; (c) about 2–10 phr EPDM; (d) about 2–25 phr of low molecular weight, typically liquid or wax-like, EPDM; and (e) about 10–55 phr titanium dioxide. In another aspect of the invention, a tire is provided in which such white sidewall composition is sulfur cured.

Discussion of diene-based rubbers

More generally, suitable diene-based rubbers would include homopolymers of butadiene or isoprene such as cis-1,4-polybutadiene, cis-1,4-polyisoprene, natural rubber and blends thereof.

Discussion of butyl rubbers

Desirably, the butyl rubber will be an essentially saturated rubber, and will comprise a copolymer of primarily polyisobutylene (~97%) and a minor amount of polyisoprene (~3%) and halogenated derivatives thereof, e.g., chlorinated butyl rubber and brominated butyl rubber. More generically, the butyl rubber is a copolymer which will comprise at least 50, desirably at least 80 and preferably at least 90 weight percent repeat units from $C_4$ to $C_7$ isomonoolefins having $C_4$ as a majority portion thereof and a conjugated diene. In a preferred embodiment, the butyl rubber will comprise from about 95 to about 99 weight percent isobutylene and from about 1 to about 5 weight percent of diolefins. When the butyl rubber is halogenated, it will contain generally less than 5 percent by weight halogen. In a preferred embodiment, the butyl rubber will have from about 0.25 to about 2.5 weight percent halogen, more desirably from about 0.5 to about 1.75 weight percent halogen. The lightly halogenated versions of the above polymers are used due to beneficial changes in cure behavior. In another embodiment of the invention, the butyl rubber will further comprise styrene and derivatives thereof, present in an amount from about 1 to about 20 weight percent, and more desirably from about 2 to about 15 weight percent of p-alkylstyrenes.

Discussion of EPDM copolymers

Desirably, the ethylene propylene diene monomer (EPDM) copolymer comprises repeat units of from about 20 to about 90 weight percent, and more desirably from about 30 to about 85 weight percent ethylene, from about 10 to about 80 weight percent, more desirably from about 15 to about 70 weight percent of at least one alpha olefin having from 3 to 16 carbon atoms (usually mostly propylene) based on the total of ethylene and alpha olefins having from 3 to 16 carbon atoms, and from about 1 to about 15%, of one or more non-conjugated dienes. Examples of non-conjugated dienes would include 1,4-hexadiene and cyclic non-conjugated dienes such as 5-ethylidene-2-norbornene (ENB), norbornadiene, methylnorbornene, dicyclopentadiene, 2-methylnorbornadiene, 4,7,8,9-tetrahydroindene, 1,5-cyclooctadiene and 5-vinyl-2-norbornene. The EPDM will generally have a weight average molecular weight in the range of greater than about 75,000 and 1 million or higher, typically between about 75,000 and 500,000, and more typically between about 100,000 and 350,000. EPDM generally has a degree of crystallinity less than about 25 percent, preferably less than about 15 percent and more preferably less than about 10 percent as measured by means known to those skilled in the art. The elastomer having this degree of crystallinity is generally known as a "substantially amorphous" elastomer.

Discussion of lower molecular weight EPDM copolymers

These EPDM polymers are typically viscous or wax-like, low molecular weight ethylene-propylene-nonconjugated diene terpolymers. They are polymerized randomly to produce liquid or wax-like elastomers with stable saturated hydrocarbon backbones. The molecular weight of the terpolymers will range generally from about 10,000 to 50,000 molecular weight, as measured by GPC (gel permeation chromatography) in THF at 35° C. using polystyrene standards. The ethylene/propylene ratio can range from about 20/80 to about 80/20 with a range of nonconjugated diene of from about 1 to 15%. The nonconjugated diene in a preferred embodiment will be selected from the group consisting of ethylidene norbornene (ENB) and dicyclopentadiene (DCPD). The low molecular weight liquid or wax-like EPDM is characterized by having a Brookfield viscosity at 60° C. (cps, RVT #7) within a range of about 300,000 to 1 million, preferably from about 400,000 to 1 million. Non-limiting examples of liquid polymers effective in this application would include the following.

| Composition Repeating Unit[3] | | Ethylene/Propylene Ratio[1] | Termonomer (phr) | Mw[2] |
|---|---|---|---|---|
| 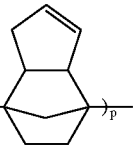<br>Iodine# = 19<br>Trilene® 65 | | 48/52 | DCPD (9.5%) | 40,000 |
| 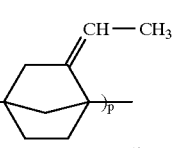<br>Iodine# = 9<br>Trilene® 66 | | 45/55 | ENB (4.5%) | 40,000 |
| 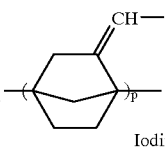<br>Iodine# = 19<br>Trilene® 67 | | 45/55 | ENB (9.5%) | 40,000 |
| 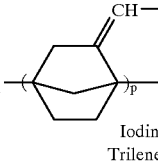<br>Iodine# = 12<br>Trilene® X-77 | | 74/26 | ENB (12%) | |

[1]Ethylene/Propylene ratio by weight
[2]$M_w$ calculated using Gel Permeation Chromatography (GPC) at 35° C. using polystyrene standards
[3]m, n and p represent weight percent amounts of propylene (or isoolefin), ethylene and termonomer respectively For purposes of this description, the "compounded" rubber compositions refer to the respective rubber compositions which have been compounded with appropriate compounding ingredients such as, for example, oil, stearic acid, zinc oxide, silica, wax, antidegradants, resin(s), sulfur and accelerators(s).

Known crosslinking agents (also known as curatives) which can be used include sulfur, sulfur accelerators, peroxides, other non-sulfur curatives, sulfur donor compounds, etc. Sulfur accelerators include guanidines, thiurams, dithiocarbamates, thioureas, thiazoles, sulfenamides and xanthates. Peroxides include dialkyl peroxides, peresters, hydroperoxides, peroxydicarbonates, etc. Crosslinking agents also include zinc oxide, etc. The use of these crosslinking agents, their effective amounts, etc., are well known to the art.

Fillers can be added to the non-black, rubber composition. Fillers generally are particulate material added to either reduce the total cost or to enhance the stiffness and/or chemical resistance of a composition. Reinforcing fillers tend to enhance the strength of a composition. While carbon black can be utilized, it is not desirable in non-black articles and hence is used in low amounts such as will not produce a black colored rubber. Typically, this will be less than 1 phr, and preferably less than 0.5 or 0.25 phr. Preferably, the non-black rubbers are substantially free if not completely free, that is zero parts of carbon black per 100 parts of rubber. Rubber compositions with more than these amounts are generally referred to as black surfaces while those with less than these amounts are generally referred to herein as non-black.

Suitable and desired fillers include talc, clay, silica, calcium carbonate, etc. These may function in addition as pigments or pigment extenders but their principal function is as fillers although it is recognized that silica can act as a reinforcing filler when used in combination with suitable silica coupling agents. Desirable pigments include titanium dioxide, zinc oxide, white lead and antimony oxide, as well as precipitated silica, calcium silicate, calcium carbonate, treated clays, talc, and whiting. Typical utilization of titanium dioxide for imparting a significantly white color to a white sidewall rubber composition may comprise about 10 to 55 parts by weight per hundred parts by weight of rubber (phr), alternatively about 15 to about 45 phr. It is recognized that typical use of conventional amounts of zinc oxide in the rubber composition also adds a somewhat white color to the rubber composition but not normally the relatively more brilliant white imparted by the titanium dioxide. The titanium dioxide is not considered to be a rubber reinforcing pigment, at least not in the same sense as rubber reinforcing carbon black.

While processing oils are often used in rather large amounts in tires and other molded or shaped elastomer articles, if utilized in the non-black rubber, they are desirably utilized in small amounts. Small amounts of oils are from about 1 or to about 20 phr and desirably from about 2 to about 10 phr. The process oils can include non-staining oils such as naphthenic, paraffinic, and the like. Typical amounts of tackifier resins, if used, may comprise about 0.5 to 10 phr, usually about 1 to about 5 phr. Silica, if used, may be present in an amount of about 5 to about 25 phr, with or without a silica coupling agent. The philosophy of utilization of silica coupling agents to couple precipitated silica to diene-based elastomers for elastomer reinforcing purposes is well known to those having skill in such art. Representative silicas may be, for example, hydrated amorphous silicas, particularly precipitated silicas.

Representative antioxidants are, for example, non-staining antioxidants such as phenolic antioxidants as would be well known to those skilled in such art. Various antioxidants for use in rubber compositions are disclosed in *The Vanderbilt Rubber Handbook* (1978), including pages 344–346. Typical amounts of fatty acids, if used, which can include stearic acid, comprise about 0.5 to about 3 phr. Typical amounts of zinc oxide comprise about 2 to about 6 phr. Typical amounts of waxes comprise about 1 to about 5 phr. Often microcrystalline waxes are used. The presence and relative amounts of the above additives are considered to be not an aspect of the present invention which is more primarily directed to the utilization of liquid EPDM within the aforesaid specified blends of rubbers in white tire sidewall compositions.

Vulcanized rubbers can be obtained from the elastomer compositions of the present invention by a method described hereinafter, that is, preparing an unvulcanized rubber blend (elastomer composition), molding the rubber blend into a desired shape and then vulcanizing it.

In the preparation of the vulcanized rubbers of the present invention, the types and amounts of softeners to be blended, the types and amounts of compounds such as vulcanizing agents, vulcanization accelerators, vulcanization aids, etc., for forming the vulcanization system and stages for preparing the vulcanized rubber in addition to other components, are properly chosen according to the uses of vulcanized rubbers and the required properties thereof. With the softeners, those generally used for rubber are used. Examples would include petroleum softeners such as process oil, lubricating oil, paraffin, liquid paraffin, petroleum asphalt and vaseline; coal tar softeners such as coal tar and coal tar pitch; fatty oil softeners such as castor oil, linseed oil, colza oil and coconut oil; tall oil; factice; wax such as beeswax, carnauba wax and lanolin; fatty acids and salts thereof such as riconoleic acid, palmitic acid, barium stearate, calcium stearate and zinc laurate, and synthetic high-molecular weight materials such as petroleum resin, atactic polypropylene and coumarone-indene resin. Among them, petroleum softeners are preferred with process oil being particularly preferred.

In the preparation of the vulcanized rubbers of the present invention, sulfur, sulfur-containing compounds or organic peroxides can be used as vulcanizing agents. The sulfur compounds include sulfur chloride, sulfur dichloride, alkylphenyl disulfides, tetramethylthiuram disulfide and selenium dimethyldithiocarbamate. Preferably, the sulfur vulcanizing agent is elemental sulfur. As known to those skilled in the art, sulfur vulcanizing agents are used in an amount ranging from about 0.5 to about 2.0 phr, with a range of from about 0.5 to about 1.5 being preferred.

The organic peroxides include dicumyl peroxide, 2,5-dimethyl-2,5-di-(t-butylperoxy)hexane, 2,5-dimethyl-2,5-di(benzoylperoxy)hexane, 2,5-dimethyl-2,5-di(t-butylperoxy) hexine-3, di-t-butyl peroxide, di-t-butylperoxy-3,3,5-trimethylcyclohexane and t-butyl hydroperoxide.

It is preferred that vulcanization accelerators are used together with sulfur or the sulfur-containing compounds. In one embodiment, a single accelerator system may be used, i.e., primary accelerator. Conventionally, a primary accelerator is used in an amount ranging from about 0.5 to 2.0 phr. In another embodiment, combinations of two or more accelerators, which the primary accelerator is generally used in the larger amount (0.5 to 2 phr), and a secondary accelerator which is generally used in smaller amounts (0.05 to 0.5 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures, but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide and if a second accelerator is used, the secondary accelerator is preferably a guanidine, dithiocarbamate or thiuram compound.

Examples of accelerators would include thiazole compounds such as N-cyclohexyl-2-benzthiazole-sulfenamide, N-oxydiethylene-2-benzthiazolesulfenamide, 2-mercaptobenzthiazole, 2-(2,4-dinitrophenyl) mercaptobenzthiazole, 2-(2,6-diethyl-4-morpholinothio) benzthiazole and dibenzthiazyl disulfide; guanidine compounds such as diphenylguanidine, triphenylguanidine, di-o-tolylguanidine, o-tolylbiguanide and diphenyl-guanidine phthalate; aldehyde-amine or aldehyde-ammonia compounds such as acetaldehyde-aniline reaction product, butyrlaldehyde-aniline condensate, hexamethylene-tetramine and acetaldehyde-ammonia reaction product, imidazole compounds such as 2-mercaptoimidazoline; thiourea compounds such as thiocarbanilide, diethylthiourea, dibutylthiourea, trimethylthiourea and di-o-tolylthiourea; thiuram compounds such as tetramethylthiuram monosulfide, tetramethylthiuram disulfide, tetraethylthiuram disulfide, tetrabutylthiuram disulfide and pentamethylene thiuram tetrasulfide; dithio acid salt compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate; xanthate compounds such as zinc dibutylxanthate; and other compounds such as zinc flower.

It is preferred that vulcanization aids are used together with vulcanizing agents when the organic peroxides are used as the vulcanizing agents in the preparation of vulcanized rubbers of the present invention. The vulcanization aids include, variously, sulfur, quinone dioxime compounds such as p-quinone dioxime, methacrylate compounds such as polyethylene glycol dimethylacrylate, allyl compounds such as diallyl phthalate and triallyl cyanurate and other compounds such as maleimide compounds and divinylbenzene.

Sometimes, the combination of zinc oxide, fatty acid, and accelerator(s) may be collectively referred to as curing aids. And sometimes, a combination of antioxidants and waxes may be collectively referred to as antidegradants.

While the use of softening agents is described above, there is no teaching in the art as to the ability to utilize low molecular weight EPDM rubbers, typically liquid or wax-like, either in place of at least a portion thereof, or as a replacement thereto for conventionally used processing aids. In one aspect of this invention, it was unexpectedly found that the utilization of low molecular weight, typically liquid or wax-like, EPDM polymers were effective in improving the ozone deterioration performance of compounded rubbers. It is significant to note that not all low molecular weight liquid polymers are effective, as illustrated in the figure wherein liquid polyisobutylene was no more effective than that of the control which used a naphthenic/paraffinic processing oil.

As described in this application, unvulcanized rubber blends were prepared in the following manner. Namely, the above-described components are kneaded at a temperature of 80°–170° C. for 3–10 minutes in a mixer such as a Banbury mixer. The vulcanizing agents and optionally, the vulcanization accelerator or the vulcanization aid are added thereto. The resulting mixture is kneaded at a roller temperature of 40°–80° C. for 5–30 minutes by using rollers such as open rolls and the kneaded material is extruded to prepare a ribbon-form or sheet-form rubber blend.

The prepared rubber blend is molded into a desired shape by means of extrusion, calendering rolls or press. The molded article simultaneously with molding or after molding is introduced into a vulcanizer and heated at a temperature of 130°–200° C. for 1–30 minutes to obtain vulcanized rubber. In conducting such vulcanization, a mold may or may not be used. When the mold is not used, molding and vulcanizing stages are generally carried out in a continuous manner. As heating means in a vulcanizing tank, there can be used hot air, glass bead-fluidized bed, ultrashort wave electromagnetic wave and steam.

The best mode for carrying out the invention will now be described for the purposes of illustrating the best mode known to the applicant at the time. The examples are illustrative only and not meant to limit the invention, as measured by the scope and spirit of the claims.

EXAMPLE #1

A white colored mixture of a control rubber composition was prepared in accordance with the following procedure using the amounts indicated in Table 1, the physical properties thereof being described in Table 2. The initial non-productive mixing stage was in an internal rubber mixer for about 4 minutes at a temperature of about 135° C., followed by a productive mixing stage in an internal mixer for about 2 minutes at a temperature of about 95° C. The composition was briefly open mill mixed between the non-productive and productive mixing stages while allowing the rubber composition to cool to at least 30° C. or lower, before adding to the final, productive mixing stage.

EXAMPLES #2 & #3

The use of liquid polyisobutylene in place of the normally used naphthenic/paraffin processing oils will be shown in these prepared samples. The procedure utilized was identical to that described previously with the substitution of 5 phr liquid polyisobutylene (Parapol™ 2500) in sample #2 and 10 phr liquid polyisobutylene (Parapol™ 2500) in sample #3. The liquid polyisobutylene was obtained from EXXON Chemical with a molecular weight of about 2,500.

EXAMPLES #4 & #5

The use of low molecular weight liquid EPDM in place of the normally used naphthenic/paraffin processing oils is shown in these prepared samples. The procedure utilized was identical to that described previously with the substitution of 5 phr liquid EPDM (Trilene™ 67) in sample #4 and 10 phr liquid EPDM (Trilene™ 67) in sample #5. The liquid EPDM was obtained from Uniroyal Chemical with a molecular weight of about 40,000 using GPC in THF at 35° C. using polystyrene standards, a ethylene/propylene ratio by weight of about 45/55 and a percentage by weight of non-conjugated diene of about 9.5%.

TABLE 1

Rubber Compositions (phr)

| | Sample | | | | |
|---|---|---|---|---|---|
| Compound | #1 Control | #2 +low M.W. PolyIB[1] | #3 +low M.W. polyIB[1] | #4 +low M.W. EPDM[2] | #5 +low M.W. EPDM[2] |
| Non-Productive Mixing | | | | | |
| Natural Rubber[3] | 35 | 35 | 35 | 35 | 35 |
| Chlorobutyl rubber[4] | 60 | 60 | 60 | 60 | 60 |
| EPDM[5] | 5 | 5 | 5 | 5 | 5 |
| Clay | 55 | 55 | 55 | 55 | 55 |
| Stearic acid | 1 | 1 | 1 | 1 | 1 |
| Ultramarine blue | 0.4 | 0.4 | 0.4 | 0.4 | 0.4 |
| Naphthenic/paraffinic processing oil | 5 | | | | |
| Liq. Polyisobutylene[1] | | 5 | 10 | | |
| Liquid EPDM[2] | | | | 5 | 10 |
| Productive Mixing | | | | | |
| tackifier | 2.5 | 2.5 | 2.5 | 2.5 | 2.5 |
| TiO$_2$ | 45 | 45 | 45 | 45 | 45 |
| Antioxidant | 1 | 1 | 1 | 1 | 1 |
| ZrO | 5 | 5 | 5 | 5 | 5 |
| Accelerators | 1.93 | 1.93 | 1.93 | 1.93 | 1.93 |
| Sulfur | 1.5 | 1.5 | 1.5 | 1.5 | 1.5 |

[1]PARAPOL ™ 2500 from EXXON Chemical, 2,500 M.W.
[2]TRILENE ™ 67 from UNIROYAL Chemical, 40,000 M.W., 45/55 ethylene/propylene ratio, viscosity @ 60° C. = 690,000 cps (RVT #7)
[3]Natural cis-1,4-polyisoprene rubber
[4]Chlorobutyl HT-1066 from EXXON Chemical
[5]Royalene 301T from UNIROYAL Chemical

TABLE 2

Rubber Composition Properties

| | Sample | | | | |
|---|---|---|---|---|---|
| Physical Properties | #1 Control | #2 +low M.W. PolyIB | #3 +low M.W. PolyIB | #4 +low M.W. EPDM | #5 +low M.W. EPDM |
| Min. Torque (dN-m) | 6.1 | 6.0 | 5.3 | 5.8 | 5.3 |
| Max. Torque (dN-m) | 23.5 | 23.2 | 20.7 | 23.4 | 20.8 |
| Delta Torque (dN-m) | 17.4 | 17.2 | 15.4 | 17.6 | 15.5 |
| T(1) (min) | 5.5 | 5.9 | 6.1 | 5.6 | 5.6 |
| T$_{25}$ (min) | 7.8 | 8.1 | 8.1 | 7.7 | 7.7 |
| T$_{90}$ (min) | 15.4 | 15.7 | 16.2 | 15.6 | 16.2 |
| Peel Adhesion (newtons) | 26.8 | 27.2 | 30.6 | 30.2 | 32.7 |
| 300% Modulus (MPa) | 3.74 | 3.59 | 3.03 | 3.72 | 3.39 |
| Tensile Strength (MPa) | 7.02 | 7.47 | 6.50 | 7.12 | 4.98 |
| Max. Elongation (%) | 649 | 710 | 722 | 683 | 522 |
| Hardness (R.T.) | 53.4 | 49.8 | 54.0 | 50.8 | 52.2 |
| Hardness (100° C.) | 44.6 | 45.1 | 40.9 | 44.6 | 41.2 |
| Rebound (R.T.) | 32.0 | 28.7 | 28.2 | 31.3 | 32.8 |
| Rebound (100° C.) | 62.7 | 62.1 | 60.6 | 59.8 | 56.9 |

TABLE 2a

| | Sample | | | | |
|---|---|---|---|---|---|
| | #1 | #2 | #3 | #4 | #5 |
| Ozone Dynamic (days to failure) | 14 | 14 | 14 | * | * |
| Density, fraction surface cracked | 5 | 5 | 5 | 0 | 0 |
| Crack length severity | 5 | 5 | 5 | 0 | 0 |

| Density | | Severity (crack length) |
|---|---|---|
| 0 = none | 3 = ⅝ surface | 0 = none |
| ½ = edge | 4 = ¾ surface | 1 = 0.25 mm |
| 1 = ⅛ surface | 5 = sample broke | 3 = 0.72 mm |
| 2 = ⅜ surface | | 5 = 2.54 mm |

*Samples were not broken after 21 days of testing

Cure properties shown in Table 2 were determined using a Monsanto oscillating disc rheometer which was operated at a temperature of 150° C. and at a frequency of 11 hertz. A description of oscillating disc rheometers can be found in *The Vanderbilt Rubber Handbook* edited by Robert O. Babbit (Norwalk, Conn., R. T. Vanderbilt Co., Inc., 1978), pages 583–591. The use of this cure meter and standardized values read from the curve are specified in ASTM D-2084.

In such an oscillating disc rheometer, compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected. These properties include a torque minimum (Min. Torque), a torque maximum (Max. Torque), minutes to 25% of the torque increase ($T_{25}$ min), and minutes to 90% of the torque increase ($T_{90}$ min).

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

As is seen from Table 2, the basic physical properties were similar for the control as well as the compositions which contained the lower molecular weight (typically liquid or wax-like) polymers. The ozone and rooftop weathering resistance, as shown in Table 2a and in the Figure, showed the liquid EPDM at both 5 and 10 phr (Sample #4 and 5, respectively) reduced cracking when compared to the use of naphthenic/paraffinic oils and/or liquid polyisobutylene processing aids. In the laboratory ozone testing, the liquid EPDM sample showed no cracking at all, even though all of the other samples had failed. The roof experiments depicted in the figure yielded equally dramatic results. All samples were continuously exposed to atmospheric conditions. The control and liquid polyisobutylene samples lasted about 9 months while the liquid EPDM samples lasted 11 months when added at the 5 phr level, and for greater than 12 months when added at the 10 phr level. In addition, the 10 phr sample was whiter than the others.

The addition of 5 to 10 phr of liquid EPDM to a rubber composition which contains chlorobutyl, natural rubber and EPDM provides dramatic improvements in flex fatigue and ozone resistance. A similar addition of liquid polyisobutylene gave no improvement. This performance improvement was totally unexpected since the control compound already contained a majority of essentially saturated polymers (e.g., EPDM and chlorobutyl rubbers), but still exhibited ozone cracking and poor weathering during rooftop testing. In contrast, the simple addition of 5 or 10 phr liquid EPDM in place of processing oil gave a dramatic improvement in lab ozone and rooftop weathering. Also quite surprisingly, the use of liquid polyisobutylene which is also a saturated liquid polymer, gave no improvement when used in place of processing oil.

We claim:

1. A pneumatic rubber tire having a rubber sidewall composed of a carbon black reinforced rubber composition wherein said sidewall also has, as at least a portion of its outer surface, a white rubber composition essentially devoid of carbon black reinforcement, wherein said white sidewall composition is comprised of, based on 100 parts by weight rubber (phr):

about 20 to about 45 phr of at least one diene rubber;
   about 45 to about 75 phr of at least one butyl rubber;
   about 2 to about 10 phr of at least one first EPDM rubber wherein said EPDM rubber further comprises,
      a ratio of ethylene units to propylene units of from about 10/90 to 90/10,
      about 1 to about 15% of a non-conjugated diene on a percentage weight basis,
      said first EPDM rubber having a molecular weight of greater than about 75,000 to about 1 million;
   about 2 to about 25 phr of at least one second EPDM rubber wherein said second EPDM rubber further comprises,
      a ratio of ethylene units to propylene units of from about 20/80 to 80/20,
      about 1 to about 15% of a non-conjugated diene on a percentage weight basis,
      said second EPDM rubber having a molecular weight of about 10,000 to about 50,000; and
   about 10 to about 55 phr of a titanium dioxide pigment.

2. The tire of claim 1 wherein said non-conjugated diene is selected from the group consisting of 1,4-hexadiene, 5-ethylidene-2-norbornene, norbornadiene, methylnorbornene, dicyclopentadiene, 2-methylnorbornadiene, 4,7,8,9-tetrahydroindene, 1,5-cyclooctadiene and 5-vinyl-2-norbornene.

3. The tire of claim 1 wherein said at least one diene rubber is selected from the group consisting of natural rubber, synthetic cis-1,4-polyisoprene, cis-1,4-polybutadiene, and blends thereof.

4. The tire of claim 1 wherein said second EPDM rubber has a viscosity of from about 500,000 to about 800,000 cps.

5. The tire of claim 4 wherein said butyl rubber comprises at least 90 weight percent repeat units from $C_4$ to $C_7$ isomonoolefins, having $C_4$ as a majority portion thereof.

6. The tire of claim 5 wherein said butyl rubber is halogenated to a degree of about 5 percent or less by weight halogen.

7. The tire of claim 1 wherein said butyl rubber comprises:

about 20 to about 80 phr of a copolymer having at least 50 weight percent repeat units from $C_4$ to $C_7$ isomonoolefin monomers, having $C_4$ as a majority portion thereof; and
   up to about 80 phr of a homopolymer or copolymer of one or more conjugated diene monomers.

8. The tire of claim 7 which further comprises:
about 20 to about 80 phr of a copolymer having at least 90 weight percent repeat units from $C_4$ to $C_7$ isomonoolefin monomers, having $C_4$ as a majority portion thereof; and
up to about 80 phr of a homopolymer or copolymer of one or more conjugated diene monomers.

9. The tire of claim 7 which further comprises:
about 20 to about 80 phr inclusive of a copolymer having at least 95 weight percent repeat units from $C_4$ to $C_7$ isomonoolefin monomers, having $C_4$ as a majority portion thereof; and
up to about 80 phr of a homopolymer or copolymer of one or more conjugated diene monomers.

10. The tire of claim 7 wherein
said copolymer having at least 50 weight percent isobutylene repeat units is a halogenated butyl rubber having from about 0.25 to about 2.5 weight percent halogen.

11. The tire of claim 10 wherein
said halogen is selected from the group consisting of chlorine and bromine.

12. The tire of claim 1 wherein said butyl rubbers comprise:
about 20 to about 80 phr inclusive of a copolymer having at least 80 weight percent repeat units from $C_4$ to $C_7$ isomonoolefin monomers, having $C_4$ as a majority portion thereof; and
about 1 to about 20 phr of a p-alkylstyrene.

13. The tire of claim 1 wherein said second EPDM is selected from the group consisting of the following formula

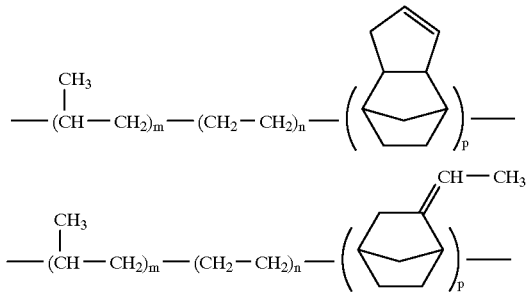

and wherein
m and n are percentages on a weight basis, each value of which can range from about 20% to 80%, and
p is a percentage on a weight basis which ranges from about 1 to about 15%.

14. A process for improving the ozone resistance of a pneumatic rubber tire having a rubber sidewall composed of a carbon black reinforced rubber composition wherein said sidewall also has, as at least a portion of its outer surface, a white rubber composition devoid of carbon black reinforcement, wherein said white sidewall composition is comprising a diene rubber, a butyl rubber, and a titanium dioxide, said process comprising the step of
blending at least one first EPDM rubber
wherein said first EPDM rubber further comprises,
a ratio of ethylene units to propylene units of from about 10/90 to 90/10,
from about 1 to about 15% of a non-conjugated diene on a percentage weight basis,
said first EPDM rubber having a molecular weight of greater than about 75,000 to about 1 million; with
at least one second EPDM rubber
wherein said second EPDM rubber further comprises,
a ratio of ethylene units to propylene units of from about 20/80 to 80/20,
from about 1 to about 15% of a non-conjugated diene on a percentage weight basis,
said second EPDM rubber having a molecular weight of about 10,000 to about 50,000.

15. The process of claim 14 wherein said at least one second EPDM rubber is added in an amount of from about 2 to 10 phr based on 100 parts by weight rubber.

16. The process of claim 15 wherein said at least one second EPDM rubber is added in an amount of from about 2 to 25 phr based on 100 parts by weight rubber.

17. The process of claim 14 wherein said conjugated diene is selected from the group consisting of 1,4-hexadiene, 5-ethylidene-2-norbornene, norbornadiene, methylnorbornene, dicyclopentadiene, 2-methylnorbornadiene, 4,7,8,9-tetrahydroindene, 1,5-cyclooctadiene and 5-vinyl-2-norbornene.

18. The process of claim 17 wherein
said second EPDM is selected from the group consisting of the following formula

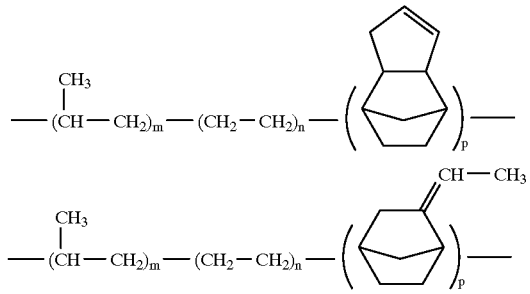

and wherein
m and n are percentages on a weight basis, each value of which can range from about 20% to 80%, and
p is a percentage on a weight basis which ranges from about 1 to about 15%;
said at least one diene-based rubber is selected from the group consisting of natural rubber, synthetic cis-1,4-polyisoprene, cis-1,4-polybutadiene and blends thereof;
said at least one butyl rubber comprises at least 90 weight percent repeat units from $C_4$ to $C_7$ isomonoolefins, having $C_4$ as a majority portion thereof.

19. The process of claim 18 wherein said butyl rubber is halogenated.

20. The process of claim 18 wherein said at least one butyl rubber is added in an amount of from about 45 to 75 phr and said at least one diene rubber is added in an amount of from about 20 to 45 phr.

* * * * *